March 29, 1927.
F. H. WINTER
1,622,620
REGULATING APPARATUS
Filed Sept. 23, 1924
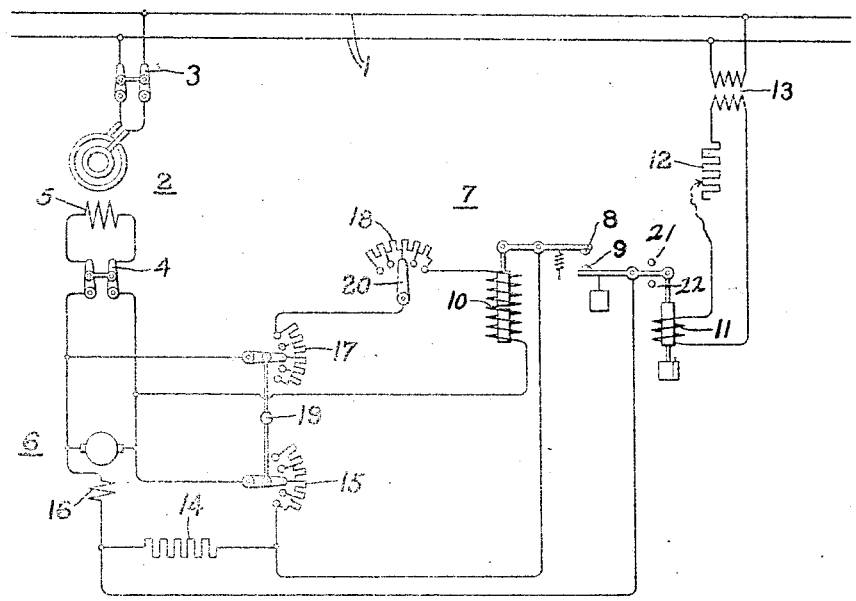
Inventor:
Fred H. Winter,
by *Alexander F. Lunt*
His Attorney.

Patented Mar. 29, 1927.

1,622,620

UNITED STATES PATENT OFFICE.

FRED H. WINTER, OF SCHENECTADY, NEW YORK, ASSIGNOR TO GENERAL ELECTRIC COMPANY, A CORPORATION OF NEW YORK.

REGULATING APPARATUS.

Application filed September 23, 1924. Serial No. 739,415.

My invention relates to apparatus for regulating the excitation and voltage of alternating current generators which are utilized for energizing power transmission lines or systems, and has for its object the provision of a regulating apparatus which may be readily calibrated to maintain a safe voltage when the transmission systems is being charged and a part of the generator excitation is supplied by the charging current of the power line.

It is well known that the charging current of a power transmission line or system may attain a very considerable value especially where long stretches of line are involved and the inductive load is comparatively light when service of the line is initiated. Under these conditions, the line charging current may supply a very considerable proportion of the generator excitation and the proportion of the generator field current required to be supplied from the generator exciter may be comparatively small. There is then presented the necessity of maintaining the exciter load current at a value which is dependent on the magnitude of the line charging current and which may be quite low as compared with the value of the exciter load current under normal operating conditions. Both in the case of large line charging currents and in those cases where it is required to test out a transmission line for possible faults, it is desirable to initiate the operation of the exciter at a comparatively low voltage and gradually to raise the value of the exciter voltage to its normal value. During this operation, the exciter is operating on the unstable portion of its magnetization curve and slight changes in the exciter speed or excitation are likely to produce large variations in the exciter voltage and generator excitation. Hand control of the generator excitation under these conditions is unsatisfactory for the reason that it is practically impossible manually to regulate the generator in a smooth and steady manner.

In accordance with my invention these difficulties are avoided by providing a regulating apparatus capable of maintaining the generator excitation at a value dependent on the operating conditions encountered.

My invention will be better understood from the following description when considered in connection with the accompanying drawing and its scope will then be pointed out in the appended claims.

The drawing shows a power circuit which comprises conductors 1 and is arranged to be supplied with current from a dynamo-electric machine 2 through a switch 3. A switch 4 is provided for connecting the field winding 5 of the machine 2 to an exciter 6 from which it is supplied with exciting current. For the purpose of regulating the voltage of the exciter 6, a regulator apparatus 7 comprising regulator elements shown as vibratory contacts 8 and 9 is provided. The contact 8 is arranged to be operated in accordance with the energization of the direct current control magnet 10 while the position of the contact 9 is determined by the energization of the alternating current control magnet 11 which is illustrated as connected to the line 1 through an adjustable resistor 12 and a potential transformer 13, stops 21 and 22 being arranged to limit the movement of the contact member 9. The vibratory contacts 8 and 9 are provided for periodically short circuiting a resistor 14 which, together with the auxiliary resistor 15 is connected in the circuit of the exciter field winding 16. The operating coil of the direct current control magnet 10 is arranged to be interconnected with the armature circuit of the exciter 6 through adjustable resistors 17 and 18. An operating handle 19 may be provided for simultaneous adjustment of the resistors 15 and 17. It will be observed that movement of the handle 19 upwardly increases the part of the resistor 15 connected in the field circuit of the exciter 6 and decreases the part of the resistor 17 connected in the circuit of the coil of the direct current control magnet 10 and that movement of the handle 19 in the opposite direction decreases the part of the resistor 15 connected in series with the exciter field circuit and increases the part of the resistor 17 connected in series with the direct current control coil. When the handle 19 is in its uppermost position, and the contact number 20 of the resistor 18 is in a position to exclude the resistance element of this resistor from the circuit of the direct current control coil, the regulating apparatus is arranged for charging the line 1 with a low voltage on the exciter 6.

Assuming the machines 2 and 6 to be operating at normal speed and the regulating apparatus to be arranged for supplying a low value of generator field current from the exciter 6, the switches 3 and 4 may be closed. With these connections the generator field current supplied from the exciter will be comparatively low and the alternating current control coil will be inoperative to raise the contact 9 due to the low voltage of the line 1. The contact 8 will be held, against the tension of the spring which biases it to closed position, out of engagement with the contact 9 due to the energization of the direct current control coil. The exciter voltage and that of the line 1 may now be raised by moving the contact member 20 of the resistor 18 to the left, thereby tending to cause equalization of the opposed forces exerted on the vibratory member by the spring and coil 10 respectively. Under these conditions, the contact 8 is operated in response to variation in the direct current voltage and the regulator functions as a direct current regulator for regulating the voltage of the exciter during low voltage operation. As the voltage of the line is increased, the alternating current control coil will begin to operate the contact 9 at a normal voltage determined by the setting of the rheostat 12. When this occurs, the operating handle 19 may be moved downwardly to insert the resistance element of the resistor 17 in the circuit of the direct current control coil and to exclude that of resistor 15 from the exciter field circuit, thus maintaining the excitation of the coil 10 at a value suitable for producing vibration of the contact 8 and at the same time controlling the field circuit resistance of the exciter in a manner to cause the desired line voltage to be maintained by the regulator. After the line has thus been charged additional machines provided with ordinary regulators may be connected to the line. The machine 2 may then be used to supply the line in parallel with such machines or if desired it may be used as a synchronous motor to regulate the power factor of the line.

As will be evident to those skilled in the art, my invention permits of various modifications. I therefore aim by the appended claims to cover all changes and modifications within the true spirit and scope of my invention.

What I claim as new and desire to secure by Letters Patent of the United States is:—

1. The combination of a machine provided with field and armature circuits, and a regulating apparatus comprising an element arranged to be energized in accordance with the voltage of said armature circuit, an element arranged to be energized in accordance with the voltage of said field circuit, and means associated with one of said elements for causing it to regulate the excitation of said machine independently of the voltage of said armature circuit.

2. The combination of a machine provided with field and armature circuits, and a regulating apparatus comprising an element arranged to be energized in accordance with the voltage of said armature circuit, an element arranged to be energized in accordance with the voltage of said field circuit, and means associated with said field circuit for causing one of said elements to regulate the excitation of said machine independently of its armature voltage.

3. The combination of a machine comprising field and armature circuits, an exciter provided with an armature circuit arranged to be connected to said field circuit and with a field circuit, and a regulating apparatus comprising an element arranged to operate over a limited range in accordance with the armature voltage of said machine, an element arranged to operate in accordance with the armature voltage of said exciter, means controlled by said regulator elements for regulating the field current of said exciter, and means associated with the field winding of said exciter for causing said second mentioned element to regulate the armature voltage of said exciter independently of the armature voltage of said machine.

4. The combination of a machine comprising field and armature circuits, an exciter provided with an armature circuit arranged to be connected to said field circuit and with a field circuit, and a regulating apparatus comprising an element arranged to operate over a limited range in accordance with the armature voltage of said machine, an element arranged to operate in accordance with the armature voltage of said exciter, means controlled by said regulator elements for regulating the field current of said exciter, and means comprising an adjustable resistor arranged to cause said second mentioned element to regulate the armature voltage of said exciter independently of the armature voltage of said machine when said armature voltage is not within the operating range of said first mentioned element.

5. The combination of a machine comprising field and armature circuits, an exciter provided with an armature circuit arranged to be connected to said field circuit and with a field circuit, and a regulating apparatus comprising an element arranged to operate over a limited range in accordance with the armature voltage of said machine, an element arranged to operate in accordance with the armature voltage of said exciter, means controlled by said regulator elements for regulating the field current of said exciter, and means comprising a pair of mechanically coupled resistors associated respectively with said second mentioned regulator element and with the field circuit of said exciter for causing said second mentioned element to regulate the armature voltage of said exciter when the armature voltage of said machine is not within the operating range of said first mentioned element.

In witness whereof, I have hereunto set my hand, this 22nd day of September, 1924.

FRED H. WINTER.